Aug. 30, 1960

A. H. BOBECK 2,951,240

MAGNETIC CORE CIRCUIT

Filed Oct. 16, 1956

INVENTOR
A. H. BOBECK
BY Kenneth B Hamlin
ATTORNEY 2,951,240

MAGNETIC CORE CIRCUIT

Andrew H. Bobeck, Chatham, N.J., assignor to Bell Telephone Laboratories, Incorporated, New York, N.Y., a corporation of New York Filed Oct. 16, 1956, Ser. No. 616,308

12 Claims. (Cl. 340—174)

Figure 1:
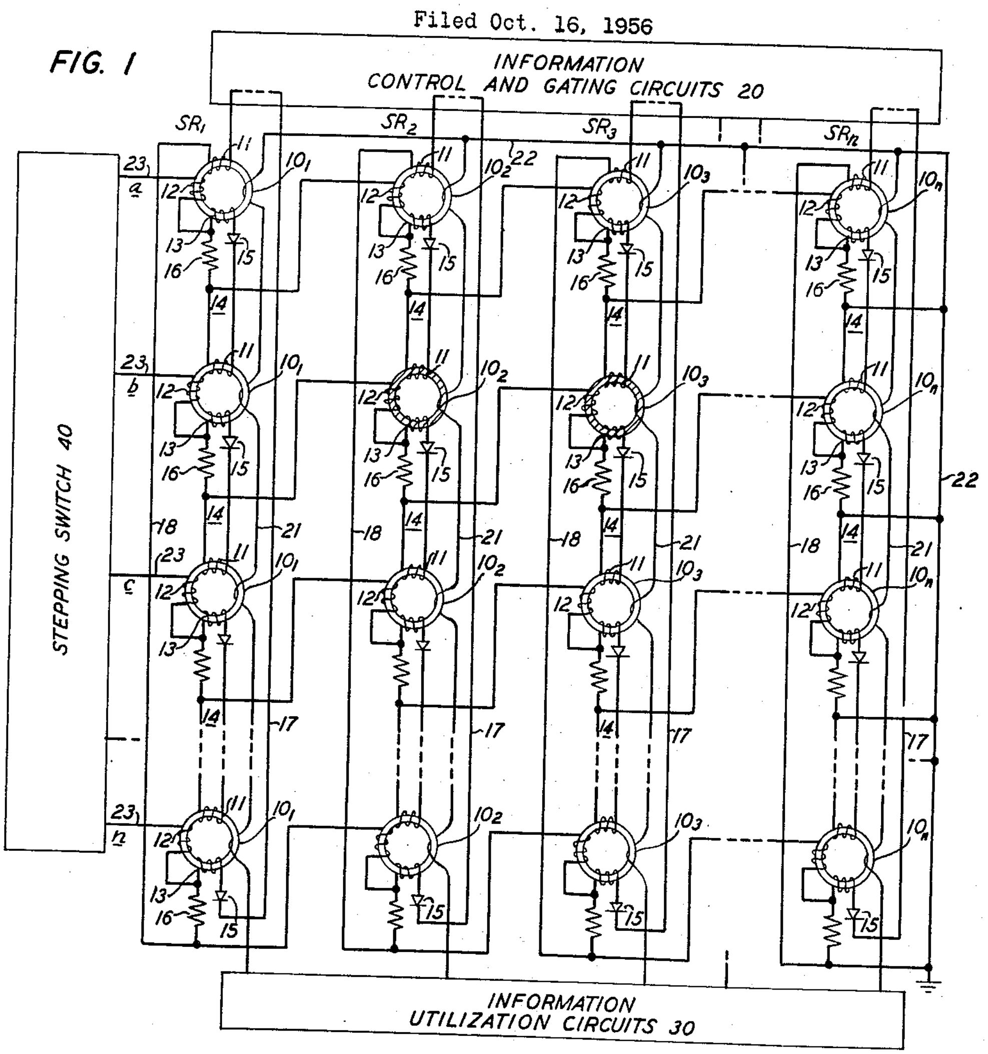

This invention relates to magnetic core circuits and more particularly to such circuits as they are employed in information storage and processing systems. The magnetic core circuits contemplated herein concern themselves, according to one aspect of this invention, particularly with the transfer of information from one magnetic core storage element to another.

Magnetic cores having the favorable characteristic of remaining in a particular condition of magnetic saturation to which driven by an applied magnetomotive force have found wide use as is well known. Thus, magnetic cores have been advantageously employed as binary storage elements in pulse generating circuits, shift registers, memory matrices, and the like. The advantages of the use of magnetic cores in terms of speed of operation, power requirements, reliability, et cetera, are well known and their employment in shift registers and memory matrices particularly, have made possible the handling of binary information in a manner not previously known. To make the most advantageous use of magnetic cores in applications such as the latter two mentioned, other problems, however, are encountered.

Magnetic core shift registers or delay lines frequently employed as buffer or intermediate information storage means in data processing systems, have the cores therein arranged serially. Output windings of one core are coupled to the input windings of an adjacent core in a manner such that the switching from one condition of remanent magnetization of the transferor core to the other condition of remanent magnetization will induce a voltage in its output winding. A current will thereby be caused to flow in the coupling in a direction such as to tend to switch the remanent magnetization of the adjacent or transferee core, the input winding of which is coupled to the output winding of the transferor core. Such a shift register is described by Wang and Woo in "Static Magnetic Storage and Delay Line," Journal of Applied Physics, volume 21, January 1950. Suitable isolation of the switching operation between individual cores is achieved by the use of a unilateral conducting means in the coupling circuit between the cores, this means generally taking the form of a diode element. The well known expedient of placing a diode in a shift register coupling loop, although effectively preventing undesired backward transfer of information, introduces into the register the energy dissipating effects of the natural threshold of each of the diodes with a resulting increase in overall register energy requirements. Any improvements in diode characteristics will therefore effect a corresponding improvement in coupling loop efficiency. This may readily be accomplished by inserting a battery of suitable potential in the coupling loop in series with the diode. However, resort to this means would involve a battery per core of the register or at least a single battery capable of supplying considerable currents to accomplish the biasing function.

Further, and also in connection with desired shift register coupling loop improvements, it has been found advantageous that the shift register present to the source of advance pulses a nearly constant impedance. It is evident from the consideration of the well-known shift register that the voltage drop across each advance winding of the individual cores will vary depending upon the particular binary value stored in the core to which an advance current is applied. Thus, in the commonly accepted terminology, if a binary digit "1" is stored in a core, the advance current applied to the advance winding of that core will switch the remanent magnetization of that core with a resulting drop in potential appearing across the advance winding. On the other hand, if a binary digit "0" is contained in a core the application of the advance current will have virtually no effect since the core is already in the condition of magnetic saturation to which the advance current tends to drive it. As a result, virtually no drop in potential will appear across the advance winding in the latter case. Since any pattern of binary digits may be present in a magnetic core shift register at a particular moment of operation it is evident that a wide variation of total potential drop is possible upon the application of an advance current, with attendant fluctuations in the advance current drawn. Advance current sources supplying a substantially constant current to fluctuating power demands are little affected by varying back voltages presented by the shift register. However, in some advance current source arrangements, such as, for example, those employing transistors, it is necessary to include a relatively high value of resistance in series with the advance windings of the cores of the shift register to stabilize the current demands during the information transfer operation.

The efficient transfer of binary information becomes an important consideration also in some magnetic core memory matrices. Thus, in those magnetic core matrices organized on a word basis in which the information read out must be immediately restored, any reduction in the time required to accomplish the read-write operation will be advantageous in extending the application of magnetic core memory matrices in data processing systems in which extremely high read-write speeds are requisite. One means of increasing read-write speed which is well known is to accomplish these functions simultaneously. Two arrays of cores are necessary in this case, however, resulting in the obvious disadvantage of additional equipment demands. Another method of considerably more utility in increasing read-write speed is that accomplished by an arrangement of the general character described in the co-pending application of J. H. McGuigan, No. 603,010, filed August 9, 1956. In the circuit described in that application the read and write operations are permitted to overlap in time with each word of information precessing through the matrix as it is read out and restored. Binary information stored in such a matrix is continually circulated as sequential read and write currents are applied to read and restore the information being scrutinized. By using the principle of precessing the information as one of the factors in combination with a new structural arrangement including means for increasing the efficiency of core to core transfer of information, according to one aspect of this invention, a new magnetic core memory matrix may be achieved in which read-write time of the order of 3.3 microseconds is realized.

It is another object of this invention to provide a new and improved word-organized magnetic core memory matrix having a read-out and write-in time of a duration shorter than that generally heretofore known.

Another object of this invention is to decrease the read-out and write-in time of magnetic core memory systems without an attendant increase in system components.

It is another object of this invention to provide a new and improved coupling means capable of accomplishing a more efficient transfer of information between individual cores of magnetic core data processing circuits.

Accordingly it is an object of this invention to provide new and improved magnetic core circuits.

A still further object of this invention is the provision in a magnetic core memory matrix of circuit means capable of accomplishing more efficient transfer of information.

Yet another object of this invention is a new and improved magnetic core shift register presenting a substantially constant impedance to applied advance currents notwithstanding a possible wide variation in such impedance values due to differing binary values being shifted.

Another object of this invention is a magnetic core shift register in which the novel means used to achieve increased coupling loop efficiency at the same time accomplishes a current regulation function for the register.

The foregoing and other objects are realized in one illustrative embodiment of this invention comprising an array of magnetic cores, each of the cores of which present substantially rectangular hysteresis characteristics. The cores are arranged in rows and columns generally, however, each of the columns of cores constitutes a separate and individual shift register of the general character described in the aforementioned publication by Wang and Woo. The cores of the shift registers are coupled to succeeding cores by a coupling loop embodying another of the principles of this invention. Included in the coupling loops in addition to a well-known diode is a resistor, which resistor is also included in the advance current path for switching the magnetic condition of the transferor core. The passage of advance current develops a potential across the resistor, which potential is then effective to bias the diode to its natural threshold value. Current regulation in such a coupling loop is realized from the fact that the voltage drop from the input of the advance winding of a core of the register to the output of the switching winding of the transferee core is maintained substantially constant by a suitable choice of turns of the advance, output, and activating windings of the transferor and transferee cores in a manner to be described in detail hereinafter.

Another feature of this invention is the connection of the activating windings of each of the transferor cores with the output windings of the same cores. This connection is made in accordance with the principle of operation described by M. Karnaugh in his Patent No. 2,719,961 of October 4, 1955, and also utilized in my copending application Serial No. 616,164, filed October 16, 1956. According to this feature the switching of a transferor core from a set to a reset magnetic condition by the application of an advance current will develop an electromotive force across the output of the same core. The output winding is wound in a sense such that this electromotive force will be in a direction to cause the advance current to flow in the output winding of the transferor core and thence to succeeding activating windings.

According to one feature of this invention, the shift registers utilized to make up the magnetic core memory array are distinguished from the well-known type referred to by the fact that, rather than employing the usual two phase advance currents, multiphase advance currents are applied to the registers. Thus each of the cores of a register making up a column of the memory array has applied thereto an individual advance current so that the shift of a binary information value from one core to a succeeding core of a register is effected by applying individual and successive advance current pulses to the cores. The corresponding cores of each shift register of the matrix are associated in a manner such that an advance current pulse applied to a core of one shift register is applied to all of the corresponding cores of all of the shift registers. Thus an information word may be considered as being made up of information bits contained in corresponding cores of the shift registers. Any one of the multiphase advance pulses may therefore cause a shift of the information word from one row of corresponding cores to the next preceding row of corresponding cores via the coupling loops.

It is a feature of this invention that the information shifted on a word organized basis as described above may be continuously circulated through the matrix. Each advance pulse causes an information word to precess one row of cores until, arriving at the first row of corresponding cores of the shift registers, the next advance pulse will shift the information word to the last row of corresponding cores of the shift registers. Each information word then is continuously circulated through the matrix in a manner analogous to the rotation of information words stored in a magnetic storage drum memory. Obviously, in order to provide a vacancy for each information word as it is shifted from its momentary physical address, the preceding row of corresponding cores of the shift registers must be unoccupied. Obviously, also, the capacity of the matrix herein contemplated will be one less information word than the number of cores in each shift register making up the matrix.

Individual output leads for each column thread the cores in a well-known manner in order to make an information word available on those leads each time a word is shifted from one row of corresponding cores to the next preceding row of cores. Logic circuits may be interposed at any of the corresponding coupling loops of the shift registers to introduce a new information word to the matrix rather than the one immediately read out by the last advance pulse applied. Such circuits are well known in the art and no detailed description of them need be given herein.

Figure 2:
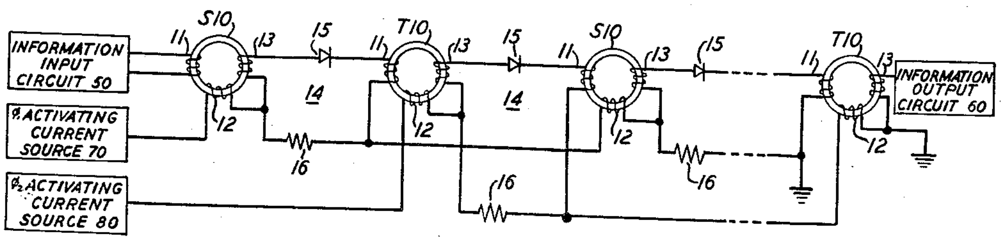

A complete understanding of the objects and features of this invention together with its organization and structure can be gained from a consideration of the detailed description thereof which follows when taken in conjunction with the accompanying drawing in which:

Fig. 1 is a schematic representation of an illustrative magnetic core arrangement in accordance with this invention constituting a memory matrix showing the manner in which individual shift registers, each utilizing the novel coupling loop, make up the matrix; and Fig. 2 shows the manner in which a conventional two-phase shift register may be realized utilizing the novel coupling loop of this invention.

An illustrative information storage matrix according to the principles of this invention is shown in Fig. 1 and comprises a plurality of shift registers $SR_1$–$SR_n$, each of which in turn comprises a plurality of magnetic cores 10 having substantially rectangular hysteresis characteristics. In this manner, the matrix of Fig. 1 presents a coordinate array of magnetic cores, the columns of which comprise the aforementioned shift registers and the rows *a*, *b*, *c*, . . . *n* of which comprise corresponding cores of the shift registers. The shift register $SR_1$, for example, is comprised of the cores $\mathbf{10}_1$ of the rows *a*, *b*, *c*, . . . *n*. Each of the cores 10 has inductively coupled thereto three windings: an input winding 11, an activating winding 12, and an output winding 13. The cores 10 of each of the registers $SR_1$–$SR_n$ are coupled to succeeding cores of the same register by means of coupling loops 14 each of which comprises an output winding 13 of a core 10, a unidirectional current element 15, an input winding 11 of a succeeding core 10, and a resistance element 16. One side of each of the activating windings 12 of the cores 10 is connected to the junction of the resistance element 16 and the output winding 13 of the same core, and the other side of each of the activating windings 12 of the cores 10 is connected to the junction of the resistance element 16 and the input winding 11 of the succeeding core 10 of the preceding shift register. Thus, for example, the activating winding 12 of the core $10_2$ of the shift register $SR_2$ is connected to the junction of the output winding 13 and the resistance element 16 of the same core and to the junction of the resistance element 16 and the input winding 11 of the core $10_1$ of the preceding shift register $SR_1$.

It should be noted that the output winding 13 of each of the last cores 10 of row *n* of the shift registers is connected through a unidirectional current element 15, a conductor 17, and through information control and gating circuits 20 to the input winding 11 of the first core 10 of row *a* of the shift registers. In addition, the input winding 11 of the first cores 10 of row *a* of the shift registers is connected by means of a conductor 18, and a resistance element 16 to the output winding 13 of the last cores 10 of row *n* of the shift registers. The control and gating circuits 20 may comprise any of the well-known logic circuit means whereby information read-out of the last cores of the shift register may be returned either in the form read-out or as a new information word to be substituted therefor. Since the circuits 20 are not considered as being within the scope of this invention, a detailed description thereof will not be provided herein. Although the cores of rows *a* and *n* have, for convenience, been referred to as first and last cores of the shift registers, respectively, and the circuits 20 have been considered as being there interposed, it is to be understood that the circuits 20 could readily be connected between any of the rows of cores of the registers. That this may be readily accomplished is obvious from the fact, as hereinbefore stated, that in operation the information words stored in the rows *a, b, c, . . . n* are continually circulated through the registers.

Read-out leads 21 are provided for each of the shift registers and thread the cores 10 thereof in an alternating sense such that the inductive coupling to adjacent cores is in series opposing to prevent the signals read-out by applied activating currents from being interfered with by the normal switching of succeeding cores of the registers. Each of the read-out leads 21 is connected at one terminal to utilization circuits 30 which circuits are also considered as being outside of the scope of this invention. Such circuits however are well known and the utilization of information signals read-out is readily envisioned by one skilled in the art. At the other terminal, the conductors 21 are connected to a common ground conductor 22.

The activating windings 12 of each of the cores $10_1$ of the first shift register $SR_1$ are connected to successive output conductors 23 of any suitable sequential stepping switch 40 capable of generating sequential switching current pulses. The switch 40 may advantageously be a switch also utilizing magnetic cores of the general character described by M. Karnaugh in the patent cited hereinbefore. The normal path of switching current pulses applied from the switch 40 when the magnetic condition of none of the cores 10 is switched may be traced with respect to an illustrative row of cores *b* as follows: conductor 23 of row *b*, the activating windings 12 and resistance elements 16 of each of the cores $10_1$–$10_n$ of the registers $SR_1$ through $SR_n$ in series, and the conductor 22 to ground.

Assume, however, for purpose of illustration, that an information word comprising the binary values "011 . . . 0" is contained in the cores $10_1$–$10_n$ of row *b* of corresponding cores of the shift registers. The set magnetic condition indicating a binary "1" is represented by the shaded cores $10_2$ and $10_3$ of row *b* in Fig. 1. Assuming further that a previous activating current pulse has cleared row *c* of information, when a current pulse is applied on the conductor 23 of row *b*, the set cores $10_2$ and $10_3$ of the registers $SR_2$ and $SR_3$ will be reset and an electromotive force will be induced across the output winding 13 of those cores by the flux change in the cores.

At this point it will be convenient to consider in detail the organization and operation of the coupling loops 14 coupling successive cores 10 of the shift registers. As is shown in Fig. 1 of the drawing, the resistance elements 16 are common to both the activating current circuits of the rows and the coupling loops 14 of the shift register columns. By a suitable selection of the resistance value of the element 16 with respect to the natural threshold of the diode, which will be the more advantageous form of the unidirectional current element 15, the potential drop across the element 16 upon the application of an activating current pulse to the activating windings 12 may be made to just equal the threshold of the diode. Accordingly, no current will flow in the diode branch of the parallel circuit constituting the coupling loop 14 when a binary "0" is being transferred, that is, when the transferor core is already in the magnetic state to which the activating current tends to drive it. However, when a binary "1" is being transferred, that is, when an applied activating current pulse on a conductor 23 and an activating winding 12 switches the magnetic condition of a core, the current in the resistance element 16 will develop a potential across it of a magnitude and polarity such as to bias the diode 15 toward its natural threshold. The switching of the core develops an additional potential of a polarity to bring the diode 15 beyond its threshold thereby diverting a fraction of the activating current into the path including the winding 13, diode 15, and winding 11, thus setting the succeeding core 10.

The current regulation advantage of the coupling loop 14 is realized from the fact that the total potential drop per coupling loop section of a shift register is substantially the same whether a binary "0" or a binary "1" is being transferred. This is accomplished by suitably selecting the number of turns of the windings 11, 12, and 13. For example, in one embodiment of this invention it was found that providing 8, 10, and 20 turns for the windings 11, 12, and 13, respectively, conveniently accomplished this result.

Returning now to the transfer of an information word from the illustrative row of cores *b*, the flux change in the cores $10_2$ and $10_3$ will cause an electromotive force to be induced across the output windings 13 thereof and a current will flow in the input windings 11 of cores $10_2$ and $10_3$ of the row *c*. The latter cores will be switched and the cores $10_1$ and $10_n$ of that row will remain in their magnetic conditions, thereby transferring the illustrative binary information word "011 . . . 0" from the row of cores *b* to the succeeding row of cores *c*. An electromotive force will also be induced across the windings 11 of the cores $10_2$ and $10_3$ due to the flux change. However, the polarity of this electromotive force is such as to back-bias the diodes 15 in the coupling loops 14 associating the cores $10_2$ and $10_3$ of row *b* with the corresponding cores of row *a*. As a result no current will be caused to flow in these coupling loops and the cores $10_2$ and $10_3$ of row *a* will be magnetically unaffected. Since no current at this time is present in the activating circuit of row *a* no potential appears across the resistance elements 16 to promote the backward transfer of information.

It should be noted that the sequential current pulses are supplied to the conductors 23 by the switch 40 in reverse order when considered from the viewpoint of the shift registers. However, considered from the viewpoint of the sequence of the applied activating currents and the array of cores as a matrix, the information words are caused to precess, that is, to be transferred row-by-row in a forward direction.

Each time an information word is transferred out of a row it is made available on the read-out leads 21 in the form of the absence or presence of voltage signals induced thereon by the non-switching or switching of the cores of a row during the time of the applied activating currents.

In Fig. 2 is shown a shift register of the type generally described by Wang and Woo in the publication cited. However, according to this invention, the shift register of Fig. 2 embodies the novel coupling loop described in detail hereinbefore. Each of the cores 10 is provided with windings inductively coupled thereto and designated by the reference characters applied in describing the matrix of this invention. Thus, in the terminology of shift registers generally, the register of Fig. 2 comprises a plurality of storage cores S10 alternated with a plurality of transfer cores T10, each core being provided with an input winding 11, an activating winding 12, and an output winding 13. The activating windings 12 of the storage cores S10 are connected in series as are the activating windings 12 of the transfer cores T10, and alternate phase activating currents are applied to the activating windings of the storage and transfer cores S10 and T10 by the $\phi_1$ and $\phi_2$ activating current sources 70 and 80, respectively. An information input circuit 50 and an information output circuit 60 are connected to the first storage core S10 and the last transfer core T10 of the register by means of the input winding 11 and the output winding 13, respectively.

Each of the cores is connected to a succeeding core by means of the coupling loop 14 which loop comprises the output winding 13, a diode 15, the input winding 11, and a resistance element 16, each of the resistance elements 16 also being connected in the applicable series circuit connecting the activating windings of the cores. The shift of information from one core to a succeeding core is accomplished via the coupling loops 14 in a manner identical to that described in detail hereinbefore in connection with the transfer of information from one core 10 to a succeeding core 10 of the registers of the matrix.

What have been described are considered to be illustrative arrangements embodying the principles of this invention and it is to be understood that modifications may be made in the structure and organization thereof without departing from the principles and scope of this invention. Although what is shown in Fig. 2, for example, is the application of a coupling loop according to this invention to a well-known two-phase shift register, the coupling loop may equally advantageously be adaptable to a shift register employing multiphase activating currents as was demonstrated in connection with the description of the matrix of this invention. In addition, although the memory matrix of Fig. 1 was described as being composed of shift registers also embodying the novel coupling loop of this invention, this matrix could as well have comprised a plurality of others of the known shift register arrangements.

What is claimed is:

1. An information storage matrix comprising a plurality of groups of magnetic cores, each of said cores being capable of assuming two conditions of remanent magnetization, a plurality of windings for each of said cores including input, output, and activating windings, a plurality of first circuit means each including a resistance element for connecting the activating windings of the cores of each of said groups of cores in series, a plurality of second circuit means for connecting the activating winding and the output winding of each of the cores of said groups of cores in series, each of said second plurality of circuit means also including a unidirectional current element and the input winding of a corresponding core of another group of said plurality of groups of cores, a plurality of third circuit means for connecting the output winding of each of the cores of said groups of cores and the input winding of a corresponding core of another group of said plurality of groups of cores in series, each of said third plurality of circuit means also including said unilateral current element and said resistance element, means for selectively setting particular cores of one of said groups of cores in one of said conditions of remanent magnetization in accordance with a predetermined code, and means including a current source for applying an activating current to the activating windings of the cores of the said one group of cores to thereby switch said particular cores to the other of said conditions of remanent magnetization.

2. An information storage matrix as claimed in claim 1, in which the output windings of said particular cores are wound in a sense such that the switching of said particular cores develops an electromotive force thereacross in a direction to cause said activating current to flow in the second circuit means connected to said output windings.

3. An information storage matrix as claimed in claim 1, also comprising a plurality of read-out leads, each of said leads being inductively coupled to corresponding cores of said plurality of groups of cores.

4. An information storage matrix comprising a plurality of magnetic cores each being capable of assuming two conditions of remanent magnetization, said cores being arranged in rows and columns, input, output, and activating windings for each of said cores, each of said activating windings being connected to one side of the output winding of the same core, first circuit means for connecting the one side and the other side of the output winding of each core of one row of cores to one side and the other side of the input winding of a corresponding core of a second row of cores through a resistor and a diode respectively, second circuit means for connecting the one side of each of said input windings of the cores of said second row and the activating windings of the next succeeding cores of said one row, means for setting particular cores of said one row of cores to one condition of remanent magnetization in accordance with a predetermined code, and means including a current source for applying switching current to the activating windings of the cores of said one row.

5. An information storage matrix comprising rows and columns of magnetic cores each being capable of assuming two conditions of remanent magnetization, input, output, and activating windings for each of said cores, said activating winding and output winding of each of said cores being serially connected, a plurality of coupling loops, each of said loops including an output winding of a core of one of said rows, the input winding of a corresponding core of another of said rows, a resistance element, and a unidirectional current element, a plurality of circuit means for connecting the activating windings of the cores of each row in series, said plurality of circuit means including respectively the resistance elements of the particular coupling loops including the output windings of the cores of each row, means including the input windings of particular cores of one of said rows of cores for setting said particular cores in one of said conditions of remanent magnetization in accordance with information to be stored, and means including the activating windings of the cores of said one row of cores for applying a switching current to said cores to switch said particular cores to the other of said conditions of remanent magnetization.

6. In an information storage matrix, in combination, an array of magnetic cores each having a substantially rectangular hysteresis characteristic, a plurality of windings for each of said cores including an input, an output, and an activating winding, a unidirectional current element, and a resistance element associated with each of said cores, the activating winding of a first core being connected to the activating winding of a second core through the output winding of said first core, a unidirectional current element, and the input winding of a third core, and also being connected to the activating winding of said second core through one of said resistance elements, and means for applying switching currents to the activating winding of said first core.

7. An information storage matrix comprising a plurality of bistable magnetic core shift registers, each core of each of which registers has an output winding, an input winding, and an activating winding thereon, each of said registers including a plurality of loop circuit means for coupling the output winding of one core to the input winding of an adjacent core, each of which loop circuit means includes a resistance element and a unidirectional current element; a plurality of activating circuit means for serially connecting the activating winding of each core of each of said registers to the activating winding of a corresponding core of another of said registers, each of said activating circuit means having a pair of parallel branches, one of said branches including the resistance element of one of said loop circuits, the other of said branches including the output winding, the unidirectional current element, and the input winding of the said one of said loop circuits; and means including a current source for sequentially applying activating current pulses to the activating windings of each of said registers.

8. An information storage matrix as claimed in claim 7 in which the cores of each of said shift registers have a common read-out lead inductively coupled thereto.

9. An information storage matrix as claimed in claim 8 in which particular corresponding cores of said shift registers have means associated therewith for selectively applying current pulses to the input windings of said particular cores to set predetermined ones of said particular cores in one condition of remanent magnetization in accordance with information to be stored.

10. In a magnetic information storage matrix, a first, second, and third magnetic element, each of said elements being capable of assuming bistable states of magnetic remanence, an activating winding for said first and said second element, an output winding for said first element, an input winding for said third element, a unidirectional current device, resistance means, means connecting said activating winding of said first element, said resistance means, and said activating winding of said second element in series, means connecting said activating winding of said first element, said output winding, said unidirectional current device, said input winding, and said activating winding of said second element in series, and means including a current source for applying activating currents to said activating winding of said first element.

11. In a magnetic information storage matrix according to claim 10, said resistance means also being connected between the input and output sides of said output and input windings, respectively.

12. A word organized information storage matrix comprising a plurality of magnetic core shift registers, corresponding cores of each of said registers having substantially rectangular hysteresis characteristics and storing information bits of a word as one or another condition of remanent magnetization, a plurality of advance leads inductively coupling respectively each of the cores of each of said registers with a corresponding core of another of said registers, a plurality of coupling loops inductively connecting each core of said registers with a preceding core, means including a current source for sequentially applying advance currents to said advance leads to successively shift information words from corresponding cores of said registers to succeeding corresponding cores of said registers, and a plurality of read-out leads associated respectively with said registers, said read-out leads inductively coupling each of the cores of each of said registers in series such that each successive shift of information words induces a signal on said read-out leads representative of said information words shifted.

References Cited in the file of this patent

UNITED STATES PATENTS

| | | |
|---|---|---|
| 2,708,722 | An Wang | May 17, 1955 |
| 2,820,956 | Rueger | Jan. 21, 1958 |
| 2,851,675 | Paivinen | Sept. 9, 1958 |
| 2,886,799 | Crooks | May 12, 1959 |

OTHER REFERENCES

"Static Magnetic Memory," by M. Kincaid et al., published January 1951, "Electronics," pp. 108–111.